May 4, 1943.   D. C. HUNGERFORD   2,318,398
SELF-LOCKING NUT
Filed Sept. 10, 1938
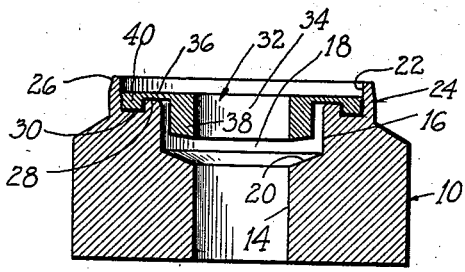
Fig. 1.
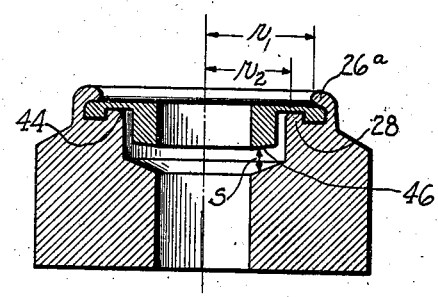
Fig. 2.
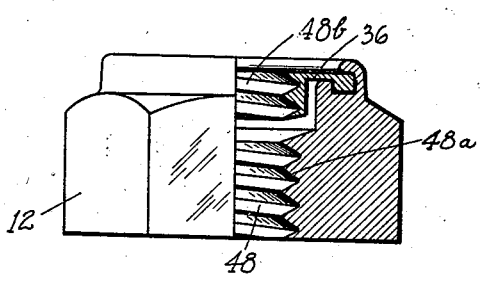
Fig. 3.
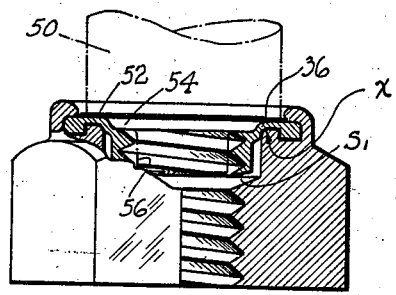
Fig. 4.
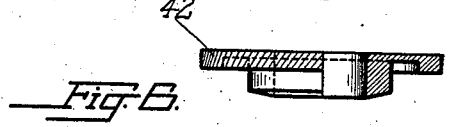
Fig. 6.
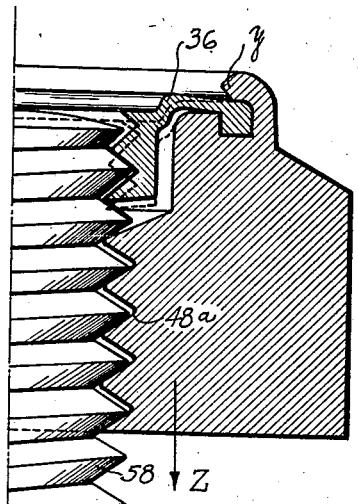
Fig. 5.
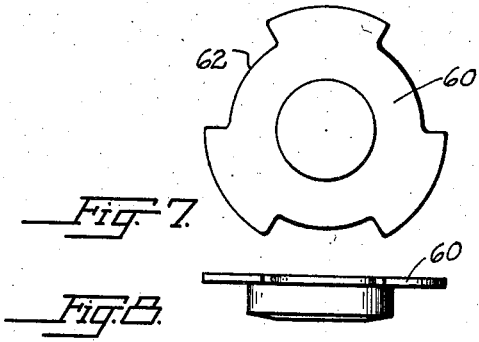
Fig. 7.
Fig. 8.
INVENTOR.
Daniel C. Hungerford
BY
Jarvis C. Marble
ATTORNEY.

Patented May 4, 1943

2,318,398

UNITED STATES PATENT OFFICE 2,318,398

SELF-LOCKING NUT

Daniel C. Hungerford, Madison, N. J., assignor to Elastic Stop Nut Corporation, Elizabeth, N. J., a corporation of New Jersey Application September 10, 1938, Serial No. 229,268

12 Claims. (Cl. 151—21)

The present invention relates to self-locking nuts and has particular reference to that type of self-locking nut which when threaded on a cooperating bolt results in continuous axial thrust exerted on the cooperating threads due to elastic flexure of a part of the nut when it is threaded onto the bolt, which thrust produces self-locking action due to maintenance of one set of flanks of the bolt and nut in continuous frictional contacting relation with each other under the influence of the thrust produced.

Self-locking nuts of numerous different kinds have been produced which produce axial thrust on the cooperating threads when the nuts are threaded on the bolts, but the several forms of nuts heretofore proposed have various shortcomings and disadvantages which render such nuts less than wholly satisfactory for all kinds and types of application.

It is a general object of the present invention to provide a novel and improved self-locking nut which overcomes the deficiencies of previously known nuts of the general type under consideration and which is of substantially universal application; which is not limited in its usefulness to low temperature applications and which on the contrary improves in its self-locking action with rise in temperature of a nut and bolt assembly; which may be removed and reapplied many times without materially affecting the efficiency of its self-locking characteristics; which will retain its self-locking properties without deterioration over long periods of continued use; which may readily be made in the form of a hardened steel nut without adverse effect on its elastic self-locking action; and which is relatively simple in construction and consists of elements the manufacture of which is readily adapted for high speed mass production methods, resulting in relatively very low cost of manufacture.

The manner in which the above general objects and other and more detailed objects of the invention are attained, and the advantages flowing from use of the novel principles of the invention, may best be understood and appreciated from a consideration of the ensuing portion of this specification in which, by way of example but without limitation, suitable examples of nut structure embodying the invention and the manufacture thereof are described.

In the accompanying drawing illustrative of such examples and forming a part hereof;

Fig. 1 is a central section showing nut structure embodying the invention in an intermediate stage of manufacture;

Fig. 2 is a section similar to Fig. 1 showing a further stage of manufacture;

Fig. 3 is a half section showing the structure of Fig. 2 in a still further stage of manufacture;

Fig. 4 is a view showing a further manufacturing step;

Fig. 5 is a view showing the completed nut applied to a bolt and illustrating the locking action of the nut;

Fig. 6 is a side view partly in elevation and partly in section of one of the elements of the nut structure shown in the preceding figures;

Fig. 7 is a top plan view of a different embodiment of the element shown in Fig. 6; and Fig. 8 is a side elevation of the part shown in Fig. 7.

Referring now to the drawing, the nut illustrated is of all metal construction embodying a nut body 10 which may be of any desired metal such as iron or steel, brass, monel, or one of the special lighter metals such as aluminum or magnesium, or alloys thereof. In one embodiment illustrated the nut body has been shown as having a base portion 12 of usual hexagonal form although it will be understood that the external shape or configuration of the nut may within the scope of the present invention be made of any form desired. The nut body is provided with a differential bore comprising a portion 14 passing through the base portion of the nut body and counterbored as at 16 to provide a socket 18 which advantageously has a conical bottom 20. The nut body is further counterbored at the top of the nut, as at 22, the upper portion of the bore being defined by an annular wall or flange 24 which as will be noted is of relatively narrow cross-section at its upper part. The outer surface of the flange may advantageously be beveled somewhat as indicated at 26.

In the embodiment illustrated the portion of the nut body between the bore portions 16 and 22 is formed to provide an annular axially extending flange 28 adjacent to the bore 16, between which flange and the bore 22 there is an encircling annular recess 30.

A locking member indicated generally at 32 is provided which in the present embodiment is in the form of an annular washer-like insert having a bore 34 of substantially the same diameter as the bore 14, a disc-like web portion 36, an inner flange portion 38 depending from the web portion 36, and an outer depending flange portion 40.

As will be observed from Fig. 1, this form of insert may be said to be generally U-shaped in cross-section.

For reasons hereinafter more fully appearing, the disc portion 36 is relatively very thin in cross-section axially of the nut and because of the relatively very thin cross-section required for this portion of the structure, the insert is preferably in all cases made of non-corrodible material such as stainless steel or the like, regardless of the material of which the nut body is made. As will hereinafter more fully appear, stainless steel is particularly advantageous for other reasons in the manufacture of hardened nuts. It is essential to the proper functioning of the nut that the material of the insert have a substantial degree of elasticity and not be of any substantially non-elastic material such for example as lead.

By way of example it has been found that when the insert is made of preferred material such as stainless steel or other material having equivalent physical properties, particularly that of elasticity, satisfactory results are obtained when the web portion of the insert, which may for convenience be considered as the diaphragm portion, is of the order of from ten to fifteen thousandths of an inch thick for a small nut of the order of ⅛ to ¼ inch thread diameter. For larger sizes of nuts this thickness of the diaphragm may be increased, the amount of increase of thickness depending upon the material of the diaphragm and the size of the nut.

The nut body and the insert are separately formed by any suitable machining operations and as will be apparent from Fig. 1, the symmetrical nature of the shapes taken by these are such that they may be finished to desired dimensions very rapidly and at low cost by many well known types of automatic screw machines. After being suitably formed to desired dimensions, the two parts are assembled in the relation shown in Fig. 1, with the U-shaped cross-section of the insert in inverted position, the flange part 40 of the insert fitting into the recess 30 of the nut body and the outer part of the diaphragm portion resting against the top of the annular flange 28 projecting upwardly in the bore of the nut body.

In order for the finished nut to function properly, the insert must be retained against turning movement in the nut body. This may be accomplished in any desired and suitable manner. In the embodiment illustrated, the outer surface of the insert is knurled as indicated in Fig. 6, this knurled surface having a sufficiently tight or locking fit in the bore 22 of the nut body to prevent relative turning movement between the two parts. After the parts are assembled as shown in Fig. 1, the upper portion of the flange 26 which extends above the top of the insert is beaded over in any suitable manner, as by a spinning or pressing operation, to form a lip 26a extending inwardly over the top of the outer part of the insert. In some instances the axial pressure exerted on the insert by the lip may alone be relied on to lock the insert against turning movement in the nut body. In connection with this operation it is particularly to be noted that the radius of the innermost circle of contact between the lip 26a and the insert, which in the embodiment illustrated is indicated by the radius $r_1$ (Fig. 2), is greater than the radius $r_2$ of the innermost circle of contact between the nut body and the lower face of the diaphragm. For convenience in considering the action of the nut, the circular line of contact between the lip 26a and the insert, having the radius $r_1$, may conveniently be considered as a first fulcrum established at a given radius, and the circular line of contact between the nut body and the lower surface of the diaphragm portion of the insert, having the radius $r_2$, may be considered as a second fulcrum of different radius. Advantageously, the portion of the nut body forming this latter fulcrum is slightly rounded as indicated at 44 for reasons hereinafter appearing and the lower end surface 46 of the inner flange 38 of the insert is advantageously beveled to an angle approximating the angle of the conical shoulder 20 at the bottom of the socket 18 in the nut body.

After the parts of the nut are assembled as shown in Fig. 2, the assembly is then threaded to provide a thread 48 which is in the nature of an interrupted thread the major section 48a of which is in the bore of the nut body and the minor section of which 48b is in the bore of the insert.

After the nut is threaded as shown in Fig. 3, the central part of the insert 32 is then deformed so that the diaphragm portion 36 is dished toward the base of the nut. In this operation a part at least of the metal of the diaphragm portion of the insert is stressed beyond its elastic limit so that a permanent set in the metal occurs.

The dishing of the diaphragm toward the base of the nut will of course displace the thread section 48b of the insert axially relative to the thread section 48a in the nut body and if the nut is to function properly the amount of this displacement must be such as to leave the two thread sections in out-of-phase relation to each other. In order to have these sections in out-of-phase relation it will be evident (assuming the thread sections to be in phase before the deforming operation) that the axial displacement effected by the deforming operation must not be equal to the pitch of the thread or any multiple thereof. Actually, the amount of displacement must be governed so as not only to avoid displacement by exactly one pitch or a multiple thereof but also to avoid making the displacement approach the value of one pitch, or a multiple thereof, within the limits of axial play between bolt and nut threads made in accordance with usual commercial standards. The reason for this is that in order for the nut to function properly a bolt threaded through the body of the nut must not be able to freely enter the thread section of the insert.

Particularly in the case of small nuts or nuts of any size having a thread with a very fine pitch, the deforming operation must be carried out with a great deal of accuracy if it is reliably to be avoided that the thread of the insert after deforming is in phase or so nearly in phase with the thread section of the nut body that the bolt thread can freely enter the thread section of the insert.

A preferred method of performing the deforming operation in order to insure the desired character of out-of-phase relationship of the thread sections is through use of a punch of the kind indicated at 50 in dot-and-dash lines in Fig. 4. The punch 50 is provided with a circular shoulder 52 adapted to abut against the supported outer portion of the diaphragm part of the insert to limit the downward movement of the punch relative to the nut. Inside the shoulder 52, the punch is provided with a circular projection 54 which acts to depress the central unsupported portion of the diaphragm part of the insert when the punch is moved to the seated position shown in the figure. Advantageously, but not necessarily, the punch is provided with a pilot portion 56 adapted to enter the bore of the insert in order to center the nut with respect to the projection 54 and insure deformation of the diaphragm of the insert concentrically with respect to the axis of the bore.

By utilizing a punch the movement of which relative to the nut is definitely limited by the seating of a shoulder against the upper surface of the diaphragm of the insert, uniformity of the extent of axial displacement or dishing of the central portion of the diaphragm is insured. In spite of the fact that the metal of the diaphragm is permanently distorted by the deforming operation, the elastic nature of the material of the insert may result in a slight tendency for the metal to return toward its original position and for this reason it may, in certain instances and depending upon the specific nature of the metal of the insert, be desirable to make the depth of the projection 54 of the punch slightly in excess of the final amount of axial displacement desired, so as to allow for such tendency of the metal to return toward its original position as may exist, while insuring the desired final extent of axial displacement after the punch is withdrawn.

In order to permit the punch to displace the central portion of the insert axially further than its finally desired position, and also to in any event insure seating of the shoulder of the punch against the upper surface of the diaphragm, the length of the counter bore portion 16 of the nut body is made somewhat greater than the length of the depending flange portion 38 of the insert so that a clearance space $s$ is provided between the bottom surface of the insert and the bottom of the socket 18, which space has sufficient axial length to provide a remaining clearance space $s_1$ after the insert is deformed.

The desired degree of axial displacement of the central portion of the insert may also be secured by proportioning the parts so that the space $s$ has just sufficient depth to permit the operation to be effected by a straight punch of the diameter of the projection 54 which will act to force the bottom surface 46 of the insert into direct contact with the bottom of the socket, which contact furnishes the desired limiting stop for the deforming operation. Even if the deforming operation is limited by bottom contact, the elasticity of the material will ordinarily result in a final clearance space $s_1$ being formed after the deforming operation is completed, due to the elastic material of the insert tending to return toward its original position. It will be apparent that for different materials and different sizes of nuts the depth of the space $s$ will vary, but the proper depth is very readily and easily determined by experiment in any particular case so that in the final position assumed by the insert after the deforming operation, the displacement of the threads of the insert will result in the desired out-of-phase relation of the two thread sections.

It is particularly to be noted in connection with the above described deforming operation that the deformation and the stressing of the material of the diaphragm beyond its elastic limit to a different position of permanent set takes place at the radius $r_2$, or in other words about the fulcrum which appears as the point $x$, (Fig. 4) in the cross-section of the nut. This of course is due to the fact that outside the radius of the fulcrum point $x$, the metal of the insert is firmly and rigidly supported against downward movement by the nut body.

Turning now more particularly to Fig. 5, the action of the nut is more clearly apparent. As shown in this figure, the nut is threaded on a cooperating bolt and it will be appreciated that as the bolt is threaded through the thread section 48a and into contact with the out-of-phase thread section 48b, the insert will exert an axial thrust on the bolt in the direction of the arrow $z$ which will take up any axial play in the threads and bring the upper thread flank of the thread section 48a into frictional contact with the lower flank of the bolt thread 58.

After the inner end of the bolt abuts against the lower end of the insert, continued turning of the nut on the thread will cause the end of the bolt to deflect the diaphragm portion 36 of the insert and lift the thread section 48b of the insert until the bolt thread can enter this thread section. This action takes place against continuing resistance of the diaphragm to deflection from its set position so that the axial thrust on the bolt is continued after the nut is fully threaded onto the bolt, owing to the tendency of the insert to return to the position of Fig. 4. This axial thrust maintains constant friction not only between the upper flank of the thread section 48a and the lower flank of the bolt thread 58, but also between the lower flank of the thread section 48b of the insert and the upper flank of the bolt thread. Experience has proved that if the flanks of several turns of thread can be maintained in continuous frictional contact, such contact is sufficient to provide against turning of the nut relative to the bolt, even under the most severe conditions of vibration or shock.

In connection with the locking action afforded, it is also important to note that the locking action is not dependent upon the base of the nut being drawn up against the surface of any object held thereby and it is further to be noted that if the nut is used in such a manner it is drawn up with its base in abutting contact with any object to be held by the bolt and nut, the reactive pressure exerted by such object on the nut acting to produce axial thrust having the same direction between the bolt and the nut as that which is produced by the elastic locking part of the nut itself. The action is thus always the same whether the nut be used as a free adjusting nut or as a clamping nut.

In the nut structure embodying the present invention it is particularly to be noted that when the diaphragm is flexed upwardly by application of the nut to a bolt, the flexure takes place at radius $r_1$ at the line of contact between the upper surface of the insert and the lip 26a, or, in other words, about fulcrum point $y$ (Fig. 5) of any section. This feature is important for the reason that the flexure caused by the application of the nut to a bolt takes place in a section of the metal of the insert which has not previously been deformed beyond its elastic limit and which has not been previously overstressed. Thus the flexing of the insert in service takes place in what may be termed previously unworked metal, which is much better able to withstand a large number of flexures without fatigue and consequent danger of failure than metal which has previously been worked, such as the metal which is bent over the fulcrum $x$.

Also, it is to be noted that the radius $r_1$ is relatively large as compared with radius $r_2$. For this reason the axial displacement of the thread section $48b$ by the original deforming operation can be compensated for by flexure around the radius $r_1$ with much less angular bending movement of the metal around fulcrum $y$ than would be the case if the restoring flexure took place about the same fulcrum as that about which the metal is bent to secure the permanent set. This also tends to add to the effective life of the nut under repeated flexures of the insert occasioned by removal and reapplication of the nut to the same or different bolts, since the degree of flexure required to enable the nut to be fully threaded on the bolt may readily be kept well within the range of elastic deflection of the metal.

The deforming or dishing of the diaphragm toward the base of the nut provides another important feature of advantage in that as a result the holding power of the nut is not impaired by rise in temperature but on the contrary is enhanced by such rise. This makes it particularly satisfactory for high temperature applications. This advantage is derived as follows: Upon increase in temperature of the nut the internal diameter of the thread section $48b$ tends to decrease due to expansion, and because of the characteristics peculiar to the construction of the nut, acts to increase the axial or locking thrust on the bolt relative to the nut. The reason why decrease in diameter of the thread section $48b$ will act to exert additional axial thrust is that after the nut is screwed on a bolt, the diaphragm portion of the insert is still in dished condition with the center of the insert depressed toward the base of the nut so that any force exerted due to expansion of this dished section embodies a resultant axial component acting on the bolt in the direction toward the base of the nut.

Superficially it would appear that if the diaphragm is in a radial plane after being threaded and before being deformed, and is subsequently deformed to bring the threads into the desired out-of-phase relation, when the nut is threaded onto a bolt so that the two thread sections are again in phase relation because of being threaded onto the same bolt thread, the diaphragm would necessarily be restored to its original radial position. This would be true if the threads on the bolt and the nut were cut so that there would be no clearance whatsoever between the flanks of the cooperating threads. Such a condition is however not obtained in the production of commercial nuts and bolts. Consequently, when the nut is threaded onto a bolt, the axial movement of the thread section of the insert toward its original position is equal to an amount corresponding to the degree of out-of-phase relation of the thread sections, less the amount of clearance between the thread flanks. Since this clearance always exists, it will be evident that the insert remains in slightly dished condition even after the nut is threaded onto a bolt and in this dished condition it will exert, if it expands due to heat, an axial thrust due to expansion, in addition to the axial thrust exerted by the tendency of the flexed diaphragm to return to its permanent set position.

The insert need not necessarily be provided with an outer flange of the kind indicated at $40$ in Fig. 1, such flange however aiding in holding the insert against rotation in the nut body and also aiding in an advantageous manner the desired rigid clamping of the outer periphery of the diaphragm in the nut body. The insert may be made in the form shown at $60$ in Figs. 7 and 8, in which the outer flange is omitted as well as the knurling of the outer surface, while the diaphragm portion is provided with a series of peripherally spaced notches $62$ into which portions of the lip $26a$ are forced when the lip is formed and which act as locking parts to prevent turning of the insert.

Numerous important practical advantages are obtained by forming nut structures in the manner above described.

Among such advantages the following are particularly to be noted:

By providing a socketed bore in the nut body into which the threaded section of the insert is received, and retaining the insert in the nut body by beading over the upper flange of the latter, the insert is fully protected against undesired displacement from accidental causes in shipment or handling. It will be appreciated that with the very thin diaphragm section which is employed, a comparatively light blow on the central section of the insert might be sufficient to move it from its proper position and even if the distortion from an accidental blow or the like did not result in moving the thread section of the insert into phase relation with the remaining thread section, displacement of the thread section of the insert from the predetermined degree of out-of-phase relation would alter the amount of axial locking thrust produced by the nut. In nut structures of this kind it is highly desirable that for any given size and kind of nut all nuts produce the same degree of axial thrust and holding power. This may be particularly true in the case of nuts designed to be used with bolts of relatively soft metal, as in such case, too great an out-of-phase relationship between the thread sections may result in sufficient axial thrust being produced when the nut is threaded on the bolt, to cause the bolt thread to be injured by the nut.

As previously noted, it is highly desirable to uniformly secure a relatively very exact out-of-phase relationship between the thread sections and it will be evident that the construction of nuts in accordance with the present invention permits this to be done since the amount of deformation effected can be very accurately governed by definitely limiting the extent of the deforming operation with an accurately fixed abutment formed by part of the nut structure itself.

Nut structures according to the present invention are particularly advantageous for high temperature application, not only because of their efficient self-locking action at such temperatures, but also because of the fact that they may very advantageously be made of metal particularly suited for high temperature work, namely, of hardened steel. This possibility is afforded because of the two piece construction which permits different metals to be employed for the nut body and the insert, and also by the characteristic construction which permits advantageous use to be made of bi-metallic construction in the production of hardened nuts.

As previously noted, non-corrodible metal such as stainless steel or non-ferrous is advantageously employed for the inserts in order to eliminate the possibility of corrosion of the very thin section of the diaphragm. Another very important advantage lies in the possibility, contemplated as one of the features of this invention, of making the insert of material which is not only non-corrodible in nature but which is also non-hardening under the conditions of heat treatment which would effect hardening of a steel nut body. One such metal is stainless steel.

In the manufacture of hardened nuts it will be evident that a steel nut body can advantageously be formed and combined with a stainless steel insert, to the form shown in Fig. 3, before the steel nut body is hardened. After the parts are assembled and threaded, with the steel in unhardened condition, the hardening and deforming operations can be carried out, it being immaterial which of these latter two operations is done first. The hardening of the nut body after all machining operations have been completed on it and with the insert locked in place, will not affect the action of the nut since the temperatures required to harden the steel will not affect the hardness or elastic properties of the stainless steel insert. The same will be true if the insert is made of brass or other non-ferrous, non-hardening metal.

The nut body cannot as a matter of commercial practicability be hardened before the parts are assembled since the two parts must be in rigidly assembled relation before being threaded, in order to insure initial in-phase relation of the thread sections and the final accurately determined out-of-phase relationship of these sections. Moreover, if the nut body were hardened prior to assembly, the upper flange portion of the body would have to be subsequently drawn to soft condition to enable the retaining lip 26a to be formed and such procedure is not economically practical.

It will be understood that for the purpose of making hardened nuts a wide variety of steels may be employed and hardened in different ways. Thus high carbon and alloy steels which harden throughout when subjected to proper heating and quenching operations may be employed, or low carbon steels may be employed which are subsequently hardened by any of the well known methods involving carburizing and subsequent heat treatment to produce what is ordinarily referred to in the art as "case hardened" structure. As herein employed, the term "harden" and derivatives thereof are to be considered in their broad sense and not limited to any specific mode of hardening or type of hardened structure.

From the foregoing it will be appreciated that the invention contemplates within its scope forms of nut structure which may vary from the specific examples hereinbefore described by way of illustration, and the invention is accordingly to be understood as embracing all structures falling within the scope of the appended claims.

The method of manufacture, which is described herein but not claimed, forms the claimed subject matter of my copending divisional application Serial No. 408,003, filed August 23, 1941.

What is claimed is:

1. A self-locking nut comprising a nut body having a differential bore providing a circular socket in the upper portion of the nut body, an annular metal insert fixed against turning movement within the nut body and having a flexible diaphragm portion supported on its underside by the edge forming the upper perimeter of said socket and with another circular portion of the nut body engaging the upper side of the insert at a distance from the axis of the nut greater than the radius of said edge to retain the insert against axial displacement from the nut body, the portion of the bore in the base of the nut being threaded, the bore of said insert being threaded and coaxial with the thread section of the nut body and the threads of the two parts being in out-of-phase relation with respect to each other.

2. A self-locking nut comprising a nut body having a threaded bore, and an annular insert of elastic metal locked in the upper portion of said nut body, said insert having a threaded bore coaxial with the threaded bore of the nut body and a flexible diaphragm extending outwardly from the bore of the insert, said nut body providing a fixed circular support in axial direction both above and below said diaphragm, and the support below the diaphragm being closer to the axis of the nut than the support provided above the diaphragm when the diaphragm is in unflexed condition.

3. In a self-locking nut, a nut body having a base portion, an annular threaded metal insert secured against turning movement in said body, said insert having a central threaded bore portion and a flexible diaphragm portion extending outwardly from said central portion, the radially inner part of said diaphragm portion being dished toward said base portion and said diaphragm portion being supported against axial displacement away from said base portion at a minimum distance from the axis of the nut greater than the maximum radius of said dished portion.

4. In a self-locking nut, a nut body having a base portion, a metal insert secured against turning movement in said nut body, said insert comprising a central threaded bore portion and a flexible diaphragm portion extending outwardly from said central portion, said diaphragm portion being permanently deformed on a circle having a radius intermediate its maximum and minimum radii to dish the central part of said diaphragm portion toward the base portion of the nut, and said insert being supported against axial displacement away from the body portion of the nut on a circle having a radius greater than said intermediate radius, whereby to cause said diaphragm portion to flex at a place other than where it is bent, when said central portion is moved axially in a direction away from the base portion of the nut body.

5. In a self-locking nut, a nut body and an annular internally threaded locking insert of elastic metal having a flexible diaphragm and supported in the nut body to flex in one direction about a circle of one radius and to flex in the opposite direction about a second circle having a radius of different value from the first radius.

6. In a self-locking nut, a nut body and an annular internally threaded locking insert of elastic metal having a flexible diaphragm and supported in the nut body to flex toward the base of the nut about a circle having a first radius and to flex away from the base of the nut about a second circle having a radius longer than said first radius.

7. A self-locking nut comprising a metal nut body having a threaded bore in the base portion of the body and a circular socket coaxial with the bore in the upper portion of the body, and an annular insert of elastic metal comprising an axially extending central threaded bore portion and a relatively very thin disc-like flexible diaphragm portion, the outer portion of the insert being rigidly fixed with respect to the nut body, the central bore portion of the insert being situated in said socket and there being clearance between said central bore portion and said socket to permit movement of the central bore portion of the insert axially within the body of the nut upon flexure of said diaphragm portion.

8. A self-locking nut comprising a metal nut body having a threaded bore in the base portion of the body and a circular socket coaxial with the bore in the upper portion of the body, and an annular insert of elastic metal comprising a flexible diaphragm portion and a central threaded bore portion depending from said diaphragm portion, said diaphragm portion being situated in the nut body with the depending central bore portion situated in said socket and with the diaphragm portion rigidly supported on its lower side by the perimeter of the wall of said socket, the upper portion of the nut body being deformed inwardly to overlie the outer portion of the upper side of said insert.

9. A self-locking nut comprising a hardenable metal nut body having a threaded bore and a coacting annular insert of non-hardenable metal, said insert comprising an outer peripheral portion, an inner threaded portion and an intermediate diaphragm portion which is relatively thin as compared with said outer peripheral and inner threaded portions, said insert being held by said nut to prevent the rotation and also radial spreading of said insert, but to permit slight axial flexing only about said diaphragm portion, said threaded portion of said insert being so positioned that the threads therein are normally in an out-of-phase relationship with the threads of said nut.

10. A self-locking nut comprising a threaded nut body and an annular insert, said insert having a central threaded portion, an outer peripheral portion and an annular intermediate portion, said peripheral portion being rigidly clamped by said nut body to prevent rotation and radial spreading of the insert and to prevent axial flexing of the clamped portion, and said intermediate portion being relatively thin in axial direction as compared with said central threaded portion whereby to permit slight axial flexing of only said intermediate portion, the threads of the nut body and the insert providing two separate threaded sections positioned to be in out-of-phase relationship with respect to each other.

11. The structure of claim 10 wherein said insert is formed of resilient stainless steel.

12. The structure of claim 10 wherein said insert is generally U-shaped in cross-section, said insert being held in said nut body with said U-shaped cross-section in inverted position, the upper end and outer peripheral portions of the nut body being formed to grip the outer peripheral portion of said insert on axially opposite sides thereof, and at different distances from the axis of the nut on said axially opposite sides.

DANIEL C. HUNGERFORD.